United States Patent
Milazzo

(10) Patent No.: US 6,908,098 B2
(45) Date of Patent: Jun. 21, 2005

(54) NON-ROTATING HITCH BALL

(76) Inventor: James D. Milazzo, 13046 Gurney Rd., Baton Rouge, LA (US) 70818

( * ) Notice: Subject to any disclaimer, the term of this patent is extended or adjusted under 35 U.S.C. 154(b) by 0 days.

(21) Appl. No.: 10/249,332

(22) Filed: Apr. 1, 2003

(65) Prior Publication Data

US 2004/0195804 A1 Oct. 7, 2004

(51) Int. Cl.$^7$ ................................................ B60D 1/06
(52) U.S. Cl. ........................................................ 280/511
(58) Field of Search ............................. 280/416.1, 507, 280/511, 477, 512, 513

(56) References Cited

U.S. PATENT DOCUMENTS

| | | | | |
|---|---|---|---|---|
| 3,876,242 A | * | 4/1975 | Eaton .......................... | 280/511 |
| 4,032,171 A | * | 6/1977 | Allen et al. ................... | 280/507 |
| 4,417,748 A | * | 11/1983 | Dortch ......................... | 280/477 |
| 4,613,149 A | * | 9/1986 | Williams, Jr. ................ | 280/508 |
| 5,087,064 A | * | 2/1992 | Guhlin ......................... | 280/507 |
| 5,158,316 A | * | 10/1992 | Hutchmacher ............ | 280/415.1 |
| 6,116,633 A | * | 9/2000 | Pride ........................... | 280/511 |
| 6,315,316 B1 | * | 11/2001 | Wyant ......................... | 280/511 |

FOREIGN PATENT DOCUMENTS

WO      WO 97/22484 A   *  6/1997

* cited by examiner

Primary Examiner—Kevin Hurley
(74) Attorney, Agent, or Firm—Overton Law Firm; J. Bradley Overton

(57) ABSTRACT

An attachment to prevent rotation of a hitch ball assembly where the assembly has a ball supported by a neck on a base and has a mounting shaft. The attachment comprises a plate having top and bottom surfaces and an passageway for receiving the mounting shaft. The top surface of the plate is affixed to the base of the hitch ball. The bottom surface of the plate has a anti-rotation stud. A draw bar is used having a recess for receiving the anti-rotation stud and a passageway for receiving the mounting shaft. A fastener then engages the mounting shaft to secure the assembly in position.

20 Claims, 1 Drawing Sheet

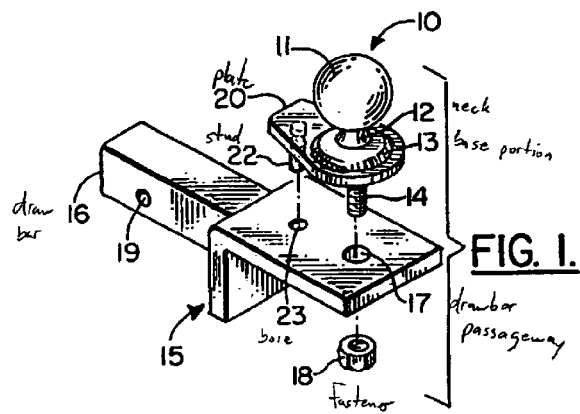
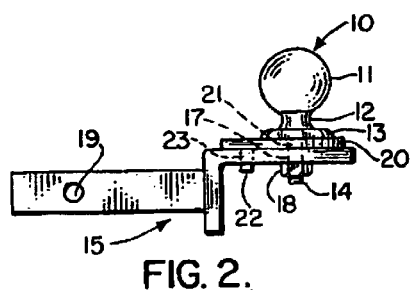
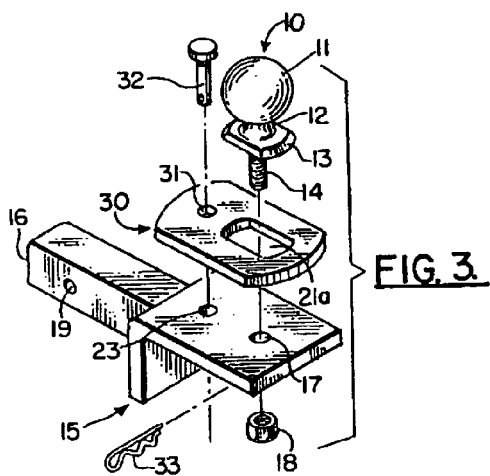
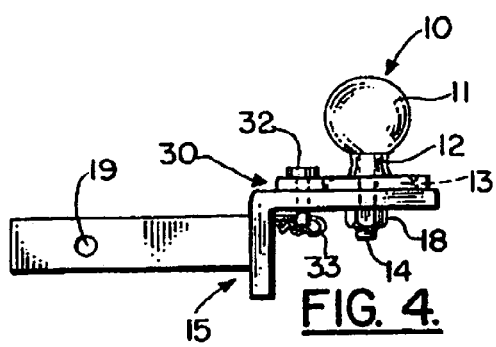

NON-ROTATING HITCH BALL

BACKGROUND OF INVENTION

1. Field of the Invention

The present invention relates to ball type trailer hitches. In particular, the invention relates to securing trailer hitch balls on towing vehicles to prevent them from becoming loose or disengaged.

2. Description of the Related Art

Ball type trailer hitches are commonly used for towing various types of vehicles and trailers (hereinafter referred to as trailers). Ball type hitches are usually a simple hitch ball mounted onto the rear of a towing vehicle. Mounting is either directly on the medial step portion of the bumper in the case of trucks or on a drawbar for a variety of towing vehicles. A drawbar can either be directly mounted to the vehicle or fit into a receiver mounted to the towing vehicle that is designed to receive the drawbar. A mating socket type device used to engage the hitch ball is then mounted onto the front of the trailer being towed. Most hitch balls are mounted by a means of a threaded mounting shaft and cooperating locking nut or lock washer and nut combination. Specifically, the threaded mounting shaft extends through a hole in the bumper or drawbar and the locking nut or nut and locking washer are snugly tightened against the bumper/draw bar to secure the trailer hitch ball in position.

A problem often occurs when these nuts are tightened. The hitch ball rotates relative to the bumper/draw bar then it is not possible to complete the tightening operation unless tools are employed to prevent this rotation.

One way of addressing this problem is disclosed in U.S. Pat. No. 5,040,817 to Dunn. The pedestal or upper portion of the hitch ball mounting shank in Dunn includes wrench flats that allow the ball to be held in position with a wrench during the nut tightening operation. This procedure stops rotation but still involves the use of two tools, one wrench to secure the hitch ball mounting shaft from rotation and one wrench to tighten the securing nut. Manipulation of two tools is inconvenient, difficult or even impossible for some handicapped people. Moreover, two tools are not always available to allow the connection to be made. The use of tools can scratch the finish of the hitch ball. This finish is frequently chrome for a cosmetic reason and when scratched or marred can expose the ball surface to the elements and eventual unsightly rusting.

The use of two tools was avoided and disclosed in U.S. Pat. No. 5,884,931 to McCoy. However, McCoy requires the use of a locking element along the shank for cutting a mating periphery in the receiving hole (passageway) of the bumper/draw bar. This approach requires meeting tight tolerances between mating parts and appropriate metal hardness between the parts to be effective. The McCoy design has limitations for retrofit to solve the problem of ball rotation on equipment already in the field because of these locking element tolerances. The manufacturing process to produce such a locking element along the shaft can be complicated and could limit the use of some standard parts.

It is also known in the art that hitch balls become loose after the initial installation. They can turn, eventually tilt, and then can come off tow vehicles if not tightened or welded in place. This can occur when a trailer is attached and in tow and result in an accidental trailer disconnection from the tow vehicle. Such accidental disconnects can cause damage to the trailer and cargo. Even worse, vehicles sharing the highway on which the trailer is being towed can be hit and damaged by the accidentally disconnected trailer, and the occupants of the other vehicles struck by the accidentally disconnected trailer may suffer serious or fatal injuries. Accidental disconnects can be reduced by the inventions covered in Milazzo U.S. Pat. Nos. 5,947,504 and 6,155,587 and the current invention can be used in conjunction with developments in these patents.

Accordingly, recognizing these and other shortcomings in the related art a need still exits for an improved, less complicated, more readily producible assembly which prevents rotation and tilting of the hitch ball and shaft relative the bumper/draw bar.

SUMMARY OF INVENTION

In accordance with the present invention there is provided a trailer hitch ball assembly for a towing vehicle. The hitch ball will not rotate, become loose and as a result it will not tilt or become disengaged from the towing vehicle. This will avoid accidental trailer disconnects that cause dangerous and sometimes lethal hazards on the road.

The non-rotating hitch ball uses a plate adapted for receiving the mounting shaft or bolt of the hitch ball and at the same time provides a surface on or against which the base of the hitch ball can rest before it is mounted to the tow vehicle. The plate is also provided with a anti-rotation stud to engage a recessed hole in the bumper to prevent relative rotation between the hitch ball and the drawbar. The invention has the object of keeping the hitch ball from rotating. The invention has the further object of preventing the hitch ball from tilting. A further objects of this invention is that it is readily adaptable to drawbars and hitch balls on the market. The invention has an additional object in that the ball hitch can be mounted to the tow vehicle with only one (bottom) wrench. This eliminates the need for a second (top) wrench normally used to create a counter force to prevent bolt rotation when tightening the hitch ball nut and thus eliminating the chance of scratching or damaging the surface (often chrome) of the hitch ball with the top wrench.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawing and descriptions will be regarded as illustrative in nature and not as restrictive.

BRIEF DESCRIPTION OF DRAWINGS

The accompanying drawing incorporated in and forming a part of the specification, illustrates several aspects of the present invention and together with the description serves to explain the principles of the invention. In the drawing:

FIG. 1 is an exploded perspective view of an embodiment of the present invention used in conjunction with a hitch ball.

FIG. 2 is a side elevation view of the same embodiment shown in FIG. 1.

FIG. 3 is an exploded perspective view of an alternative embodiment used in conjunction with a different style of hitch ball, where the hitch ball has wrench flats and the passageway is enlarged to fit the base section.

FIG. 4 is a side elevation of the alternative embodiment shown in FIG. 3Reference will now be made in detail to the present preferred embodiments of the invention, examples of which are illustrated in the accompanying drawing.

DETAILED DESCRIPTION

Reference is now made to FIG. 1 showing standard hitch ball assembly 10 comprised of a ball portion 11 supported by a neck portion 12 on a base section 13. This ball portion 11 is frequently 1⅞, 2 or 2⁵⁄₁₆ inches in diameter. As known in the art, such a hitch ball 11 is adapted for receipt of a cooperating mating socket of a trailer. A threaded mounting shank or shaft 14 extends from the base section 13 and is used to connect the ball assembly 10 to a drawbar 15. The drawbar can either be an integral part of the bumper of a towing vehicle or the drawbar is frequently designed to engage a hitch receiver mounted to the towing vehicle.

FIG. 1 shows a drawbar 15 having a square end 16 that can be used to fit into such a vehicle mounted hitch receiver. Opening19 is used to receive a pin to lock the drawbar onto such a hitch receiver. The drawbar 15 has a hole or drawbar passageway 17 for receiving the mounting shaft 14. A locknut 18 is used to tighten the ball assembly 10 unto the drawbar 15. A lock washer/nut combination could readily be used instead of a locknut. Plate 20 is used in conjunction with a standard hitch ball assembly 10. The plate has an aperture or passageway that is not shown in FIG. 1 but can be seen in the side elevation as hidden lines 21 on FIG. 2 or as 21a on plate 30 (an alternative embodiment) shown in FIG. 3. Plate 20 is further provided with a non-rotating stud 22 extending from the bottom plate surface of the plate that fits into bore or recess 23 in the drawbar 15 and prevents the hitch ball assembly from rotating. This bore will be all the way through the drawbar if a bolt or pin with a fastener is used as the non-rotating stud (FIGS. 3 and 4) or without a fastener (FIGS. 1 and 2). By contrast the bore can be a recess only part way through the drawbar if a shorter non-rotating stud is used (not shown). This non-rotating feature allows for the locknut 18 to be turned with a wrench and the need for a second wrench to hold the hitch ball assembly is eliminated.

FIG. 2 is a side elevation showing the hitch ball assembly 10 mounted on the drawbar 15. In a preferred embodiment the base section 13 is welded to the plate 20. Plate 20 is prevented from rotational movement by a non-rotating stud 22 sized to fit bore or recess 23. This non-rotating stud can take many different forms. It can be forged as one piece with plate 20 or it could be a shaft press fit into a bore in the bottom plate surface of plate 20. The non-rotating stud can be a shaft made from various pins in the art known by many names such as spring dowels, roll pins, tension pins, split pins. All of these pins are designed to make a press fit into a bore in the plate. A bore is shown all the way through the plate in FIG. 3 but this bore can be made to only comprise a recess in the lower plate surface and not penetrate through the top plate surface thus providing a socket in which to press fit a non-rotating stud. The non-rotating stud can also be a headed shaft 32 and cotter pin 33 or simply a threaded bolt and nut.

FIG. 3 is an alternative embodiment that uses a larger aperture or passageway that not only receives the mounting shaft 14 but is sized and dimensioned to receive the base section 13 particularly a non-circular base such as bases having wrench flats (FIG. 3). A preferred embodiment would have these dimension tolerances close enough to make a tight fit to carry out the non-rotating properties on this invention and to even hold the plate 30 and hitch ball assembly 10 together.

FIG. 4 is a side elevation showing the embodiment of FIG. 3 where the hitch ball assembly and plate are attached to the drawbar.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modification as are suited to the particular use contemplated. All such modifications and variations are within the scope of the invention as determined by the appended claims when interpreted in accordance with the breadth to which they are fairly, legally and equitably entitled.

What is claimed is:

1. An attachment connectable to a hitch ball assembly to prevent rotation of the hitch ball assembly, the hitch ball assembly including a ball portion supported by a neck portion on a base section and a mounting shaft extending from a bottom end of the base section; the attachment comprising:

a plate;

a drawbar;

and a fastener for engaging the mounting shaft;

the plate having a top plate surface, a bottom plate surface and a plate passageway therebetween for receiving a bottom portion of the mounting shaft therethrough;

a bottom surface of the base section being rigidly affixed to the top plate surface surrounding the passageway after the bottom portion of the mounting shaft is positioned through the plate passageway;

the bottom plate surface having an anti-rotation stud extending outwardly from the bottom plate surface;

the drawbar having a drawbar passageway therethrough for receiving the bottom mounting shaft portion and a stud receiving recess for fittingly receiving the anti-rotation stud therein when the bottom mounting shaft portion is positioned through the drawbar passageway;

the fastener being adapted for engaging a bottom end of the mounting shaft portion so as to secure the hitch ball assembly in rigid connection with the plate and the drawbar in a manner such that when said bottom mounting shaft portion is positioned through the plate passageway and the drawbar passageway, the anti-rotation stud is positioned in the stud receiving recess of the drawbar and the fastener is engaged with the bottom of the mounting shaft portion to compress the drawbar and plate together in a non-rotatable position.

2. The attachment of claim 1, wherein the bottom plate surface has a bore; the anti-rotation stud is fittingly inserted into the bore and extends outwardly from the bottom plate surface.

3. The attachment of claim 2, wherein the anti-rotation stud is press fit into the bore.

4. The attachment of claim 2, wherein the anti-rotation stud is a bolt, the bore of the plate extends from the top plate surface to the bottom plate surface and the bolt fits into the bore and is permanently affixed to the plate.

5. The attachment of claim 4, wherein the anti-rotation stud is a bolt having a fastener, the stud receiving recess of the drawbar extends entirely through the drawbar such that the bolt is adapted to extend through the plate bore and the drawbar recess and is securely affixed with the fastener.

6. The attachment of claim 5, wherein the bolt is threaded at one end and the fastener is a lock nut or lock washer/nut combination.

7. The attachment of claim 5, wherein the bolt has a generally horizontal bore and the fastener is a cotter pin cooperating with the horizontal bore in a manner such that the bolt affixes the plate and the drawbar together.

8. The attachment of claim 1, wherein the bottom portion of said mounting shaft is threaded and said fastener is a cooperating nut.

9. An attachment connectable to a hitch ball assembly to prevent rotation of the hitch ball assembly, the hitch ball assembly including a ball portion supported by a neck portion on a base section and a mounting shaft extending from a bottom end of the base section; the attachment comprising:
   a plate;
   a drawbar;
   and a fastener for engaging the mounting shaft;
   the plate having a top plate surface, a bottom plate surface and a plate passageway therebetween for receiving a bottom portion of the mounting shaft therethrough;
   the plate passageway is dimensioned and adapted for rigidly receiving the base section after the bottom portion of the mounting shaft is positioned through the plate passageway;
   the bottom plate surface having an anti-rotation stud extending outwardly from the bottom plate surface;
   the drawbar having a drawbar passageway therethrough for receiving the bottom mounting shaft portion and a stud receiving recess for receiving the anti-rotation stud therein when the bottom mounting shaft portion is positioned through the drawbar passageway;
   the fastener being adapted for engaging a bottom end of the mounting shaft portion so as to secure the hitch ball assembly in rigid connection with the plate and the drawbar in a manner such that when said bottom mounting shaft portion is positioned through the plate passageway and the drawbar passageway, the anti-rotation stud is positioned in the stud receiving recess of the drawbar and the fastener is engaged with the bottom of the mounting shaft portion to compress the drawbar and plate together in a non-rotatable position.

10. The attachment of claim 9, wherein the drawbar includes a top surface and a bottom surface and the stud receiving recess is a bore through the drawbar from the top surface to the bottom surface;
   the anti-rotation stud extends through the drawbar when received into the bore such that the anti-rotation stud may be secured to prevent vertical movement of the anti-rotation stud within the bore.

11. The attachment of claim 9, wherein the bottom plate surface has a bore; the and-rotation stud is inserted into the bottom plate bore and permanently affixed thereto.

12. The attachment of claim 11, wherein the anti-rotation stud is press fit into the bottom plate bore.

13. The attachment of claim 10, wherein the anti-rotation stud is a bolt, the bottom plate bore extends through the plate to the top plate surface and the bolt is permanently affixed to the plate.

14. The attachment of claim 10, wherein the anti-rotation stud is a bolt having threads, the bottom plate bore extends through the plate to the top plate surface, threaded bolt fits through and extends from the drawbar bore in a manner such that a lock nut or lock washer/nut combination is used to secure the bolt to prevent vertical movement of the bolt within the bore.

15. The attachment of claim 10, wherein the anti-rotation stud is a bolt having a generally horizontal bore, the bottom plate bore extends through the plate to the top plate surface, the bolt fits through and extends from the drawbar bore in a manner such that a cotter pin cooperating with the horizontal bore of the bolt in a manner such that it secures the bolt to prevent vertical movement of the bolt within, the bore.

16. The attachment of claim 9, wherein the bottom portion of said mounting shaft is threaded and said fastener is a cooperating nut.

17. A non-rotating hitch ball assembly, comprising:
   a ball;
   a neck;
   abase;
   a mounting shaft;
   a plate;
   a drawbar;
   and a fastener for engaging the mounting shaft;
   the ball supported by a neck;
   the base attach to the neck;
   the mounting shaft extending from said base;
   the plate having a top plate surface, a bottom plate surface and a plate passageway therebetween for receiving a bottom portion of the mounting shaft therethrough; the bottom surface of the base being rigidly affixed to the top plate surface surrounding the passageway after the bottom portion of the mounting shaft is positioned through the plate passageway;
   the bottom plate surface having an anti-rotation stud extending outwardly from the bottom plate surface;
   the drawbar having a drawbar passageway therethrough for receiving the bottom mounting shaft portion and a stud receiving recess for fittingly receiving the anti-rotation stud therein when the bottom mounting shaft portion is positioned through the drawbar passageway;
   the fastener being adapted for engaging a bottom end of the mounting shaft portion so as to secure the hitch ball assembly in rigid connection with the plate and the drawbar in a manner such that when said bottom mounting shaft portion is positioned through the plate passageway and the drawbar passageway, the anti-rotation stud is positioned in the stud receiving recess of the drawbar and the fastener is engaged with the bottom of the mounting shaft portion to compress the drawbar and plate together in a non-rotatable position.

18. The non-rotating hitch ball assembly of claim 17, wherein the plate is affixed to the base by the plate passageway being dimensioned and adapted to rigidly receive and mate with the base.

19. The non-rotating hitch ball assembly of claim 17, wherein the bottom plate surface of the plate has a bore; the anti-rotational stud is fittingly inserted into the bare and extends outwardly from the bottom plate surface.

20. The non-rotating bitch ball assembly of claim 17, wherein the anti-rotational stud is a bolt, the bore of the plate extends from the top plate surface to the bottom plate surface and the bolt fits into the bore and is permanently affixed to the plate.

* * * * *